United States Patent
Ketharaju et al.

(10) Patent No.: US 10,200,364 B1
(45) Date of Patent: Feb. 5, 2019

(54) ENHANCED SECURE AUTHENTICATION

(71) Applicant: Wells Fargo Bank, N.A., San Francisco, CA (US)

(72) Inventors: Rameshchandra B. Ketharaju, Hyderabad (IN); Srivathsan C. Sridharan, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 176 days.

(21) Appl. No.: 15/088,698

(22) Filed: Apr. 1, 2016

(51) Int. Cl.
*H04L 29/06* (2006.01)

(52) U.S. Cl.
CPC .......... *H04L 63/0861* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 7,231,657 B2 | 6/2007 | Honarvar et al. | |
| 8,112,275 B2 | 2/2012 | Kennewick et al. | |
| 8,140,340 B2 | 3/2012 | Bhogal et al. | |
| 8,234,499 B2 | 7/2012 | Abraham et al. | |
| 8,489,596 B1 * | 7/2013 | Milton | G06Q 30/02 707/735 |
| 9,122,857 B1 * | 9/2015 | Hassan | G06F 21/32 |
| 9,160,730 B2 * | 10/2015 | Sheller | H04L 63/08 |
| 9,781,148 B2 * | 10/2017 | Mahaffey | H04L 63/0227 |
| 2009/0259470 A1 | 10/2009 | Chang | |
| 2012/0216260 A1 * | 8/2012 | Crawford | G06F 21/31 726/5 |
| 2013/0227651 A1 | 8/2013 | Schultz et al. | |
| 2015/0089568 A1 * | 3/2015 | Sprague | H04L 63/0876 726/1 |
| 2015/0121456 A1 * | 4/2015 | Milman | H04L 63/10 726/3 |
| 2015/0312041 A1 * | 10/2015 | Choi | H04L 9/3231 713/175 |

(Continued)

OTHER PUBLICATIONS

Microsoft, Secure User Authentication for the Next-Generation Secure Computing Base, http://webcache.googleusercontent.com/search?q=cache:oO4mCpT915wJ:www.microsoft.com/resources/ngscb/documents/ngscb_authentication.doc+&cd=4&hl=en&ct=clnk&gl=us, 2003, 11 pages.

(Continued)

*Primary Examiner* — Trang T Doan
(74) *Attorney, Agent, or Firm* — Merchant & Gould P.C.

(57) ABSTRACT

A method for authenticating a user of a mobile electronic computing device to perform operations on a first electronic computing device includes receiving a request to access the first electronic computing device. In response to the request to access, a first identifier is sent to the mobile electronic computing device. A second identifier is received from a second electronic computing device. The second electronic computing device is different from the mobile electronic computing device. A determination is made as to whether the first identifier matches the second identifier. When the first identifier matches the second identifier, a trust score is calculated for the user. A determination is made as to whether the trust score is equal to or greater than a threshold. When the trust score is equal to or greater than the threshold, the user is authenticated to login to the first electronic computing device.

17 Claims, 10 Drawing Sheets

(56) References Cited

U.S. PATENT DOCUMENTS

| | | | |
|---|---|---|---|
| 2016/0234206 A1* | 8/2016 | Tunnell | H04W 4/70 |
| 2016/0366635 A1* | 12/2016 | Cui | H04W 48/04 |
| 2017/0026488 A1* | 1/2017 | Hao | H04L 67/32 |
| 2017/0064550 A1* | 3/2017 | Sundaresan | H04W 12/06 |
| 2017/0140141 A1* | 5/2017 | Yan | G06F 21/32 |

OTHER PUBLICATIONS

Karan Khare, et al., Behavioural Biometrics and Cognitive Security Authentication Comparison Study, http://airccse.org/journal/acij/papers/4613acij02.pdf, Advanced Computing: An International Journal (ACIJ), vol. 4, No. 6, Nov. 2013, 10 pages.

* cited by examiner

ENHANCED SECURE AUTHENTICATION

BACKGROUND

Mobile electronic computing devices such as smart phones have become common in our society. People can use their smart phones to make telephone calls, to send and receive emails and text messages and to access websites over the Internet. It also has become common to conduct electronic transactions over the Internet using a smart phone.

When users conduct certain types of electronic transactions, for example financial transactions, the user typically needs to be authenticated before the financial transaction can occur. Conducting financial transactions from a mobile electronic computing device such as a smart phone can create challenges regarding authentication.

SUMMARY

Embodiments of the disclosure are directed to a method for authenticating a user of a mobile electronic computing device to perform one or more operations on a first electronic computing device, comprising: on the first electronic computing device, receiving a first request to access the first electronic computing device; in response to the first request to access, sending a first identifier to the mobile electronic computing device; receiving a second identifier from a second electronic computing device, the second electronic computing device being different from the mobile electronic computing device; determining whether the first identifier matches the second identifier; when the first identifier matches the second identifier, calculating a first trust score for the user; determining whether the first trust score is equal to or greater than a first threshold; and when the first trust score is equal to or greater than the first threshold, authenticating the user to login to the first electronic computing device.

In another aspect, a first electronic computing device comprises a processing unit; and system memory, the system memory including instructions which, when executed by the processing unit, cause the first electronic computing device to: receive a request to login to the first electronic computing device; in response to the request to login, send a first token to a mobile electronic computing device; receive a second token from a second electronic computing device associated with an embedded sensor; determine whether a first unique identifier in the first token matches a second unique identifier in the second token; when the first unique identifier in the first token matches the second unique identifier in the second token, calculating a first trust score for a user; determine whether the first trust score is equal to or greater than a threshold; when the first trust score is equal to or greater than the threshold, authenticating the user to login to the first electronic computing device; and when the first trust score is less than the threshold, further comprising: send a first request to the mobile electronic computing device for the user to respond to one or more first questions; receive from the mobile electronic computing device user answers to the one or more first questions; based on the first trust score and the user answers to the one or more first questions, calculate a second trust score for the user; determine whether the second trust score is greater or equal to the threshold; and when the second trust score is greater or equal than the threshold, authenticating the user to login to the first electronic computing device.

In yet another aspect, a first electronic computing device comprises a processing unit; and system memory, the system memory including instructions which, when executed by the processing unit, cause the first electronic computing device to: receive a first request from a mobile electronic computing device to login to the first electronic computing device; determine a first threshold for a first authentication trust score for logging onto the first electronic computing device; calculate the first authentication trust score, the first authentication trust score being based on a current location of a user and a profile for the user; determine whether the first authentication trust score is greater to or equal than the first threshold; when the first authentication trust score is greater than or equal to the first threshold, permit the user to login to the first electronic computing device; receive a second request from the mobile electronic computing device to perform an operation on an application running on the first electronic computing device; identify the operation to be performed; determine a second threshold for an authentication trust score for performing the operation, the second threshold being based on a type of the operation to be performed, the second threshold being equal to or greater than the first threshold; determine whether the first authentication trust score is greater than or equal to the second threshold; when a determination is made that the first authentication trust score is greater than or equal to the second threshold, permit the user to perform the operation; when a determination is made that the first authentication trust score is less than the second threshold: send a third request to the mobile electronic computing device for the user to respond to one or more first questions, the one or more first questions being personalized questions based on recent activity of the user; receive from the mobile electronic computing device user answers to the one or more first questions; based on the first authentication trust score and the user answers to the one or more first questions, calculate a second authentication trust score for the user; determine whether the second authentication trust score is greater or equal to the second threshold; when the second authentication trust score is greater than or equal to the second threshold, permit the user to perform the operation; and when the second authentication trust score is less than the second threshold: send a fourth request to the mobile electronic computing device for the user to respond to one or more second questions, the one or more second questions having answers pre-recorded by the user; receive from the mobile electronic computing device a voice response for each of the one or more second questions; compare the voice response with the answers pre-recorded by the user; based on the second authentication trust score and the voice response to the one or more second questions, calculate a third authentication trust score for the user; determine whether the third authentication trust score is greater than or equal to the second threshold; and when the second authentication trust score is greater than or equal to the second threshold, permit the user to perform the operation.

The details of one or more techniques are set forth in the accompanying drawings and the description below. Other features, objects, and advantages of these techniques will be apparent from the description, drawings, and claims.

DETAILED DESCRIPTION

Figure 1:
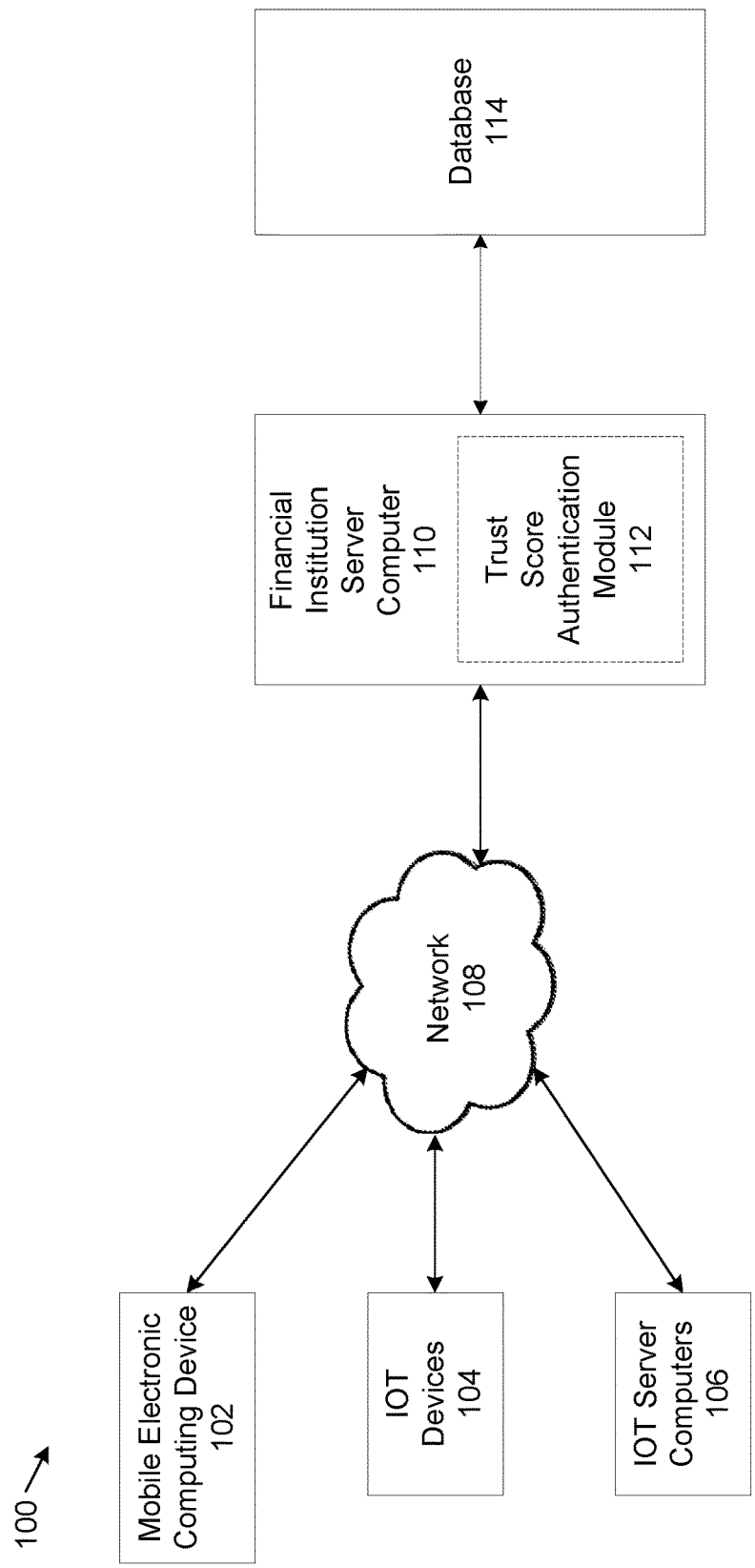
FIG. 1 shows an example system that supports enhanced secure authorization.

The present disclosure is directed to systems and methods that can be used to authenticate a user for access to an application running on an electronic computing device without requiring the user to enter a user ID and password. The systems and methods can calculate a trust score for the user and authenticate the user when the trust score is above a threshold. As discussed in more detail later herein, the trust score can comprise multiple components, including a component based on an Internet of Things (IOT) device, a component based on answers to dynamic questions, a component based on answers to static questions and a component based on a behavioral authenticator. One or more of the trust score components can include biometric aspects such as an analysis of voice prints and an analysis of facial gestures.

The systems and methods can be applied to users of mobile electronic computing devices such as smart phones. Because smart phones typically include global positioning system (GPS) software, geographical location data can be obtained for a user of the smart phone. The geographic location data can be used to obtain an activity profile for the user. For example, the geographic location data can be used to determine whether the user is at home or away from home. The geographical location data can also be used to determine a travel route that the user may be taking, for example a route that the user drives to work.

The systems and methods can make use of IOT devices to help authenticate the user. As used in this disclosure an IOT device is a physical object that is embedded with one or more of electronics, software, sensors and network connectivity to allow the physical object to exchange data. For example, an IOT device can be installed in the user's automobile. When the user is in the automobile, the user's smart phone can use a short-range communication technology such as Bluetooth to establish a communication session with the IOT device. A token from a server computer at a financial institution can be exchanged between the user's smart phone and the IOT device via the communication session. The token exchange can confirm that the user is actually in the automobile.

As another example, an IOT device can be installed on an appliance, for example a refrigerator, in the user's home. When the user is near the refrigerator, a short-range communication session can be established between the user's smart phone and the IOT device on the refrigerator. A token from a server computer at the financial institution can be exchanged between the user's smart phone and the IOT device via the communication session. The token exchange can then inform the server computer that the user is at home. A signal strength between the smart phone and the IOT device can be measured to determine how close the smart phone is to the IOT device. Other examples using IOT devices are possible.

The geographical location data and data from the user's IOT devices can be used to establish activity patterns for the user. The activity patterns can be stored at the server computer and used to help authenticate the user. For example, a determination can be made that the user drives a same route from home to the user's office each day. If the user attempts to use his/her smart phone to login to the user's account at the financial institution while driving to work (for example by pulling over to the side of the road), a determination that the user is on route to work (using a saved driving route) can be used to help authenticate the user. Other examples are possible.

Using the systems and methods, a sequence of authentication evaluations can be used to authenticate a user who is attempting to login to a computer system. In one example implementation, an IOT device authentication can be attempted first, followed by an authentication based on answers to dynamic questions, followed by an authentication based on an analysis of answers to static questions, followed by an authentication based on behavioral biometric factors. An authentication trust score can be calculated after the IOT device authentication.

When the authentication trust score based on the IOT device authentication exceeds a threshold, the user can be authenticated for login. When the authentication trust score based on the IOT device authentication does not exceed the threshold, the authentication trust score can be revised based on the answers to the dynamic questions. When a revised authentication trust score based on a combination of the IOT device authentication and the answers to the dynamic questions exceeds the threshold, the user can be authenticated for login. When the revised authentication trust score does not exceed the threshold, the authentication trust score can be revised again based on the answers to the static questions.

When the revised again authenticated trust score based on a combination of the IOT device authentication, the answers to the dynamic questions and the answers to the static questions exceeds the threshold, the user can be authenticated for login. When the revised again authentication trust score does not exceed the threshold, the authentication trust score can be revised further adding a score from the behavioral biometric factors. If the further revised authentication trust score still is not high enough to authenticate the user, the user may need to be authenticated in a traditional manner using a user ID and password combination.

As discussed in more detail later herein, the behavioral authentication can comprise calculating a behavioral trust score based on one or more of a current activity of the user, a facial recognition of the user, an analysis of a facial movement of the user such as a yawn, a smile and an eye blink, lip movement, an analysis of how the user writes a particular word an evaluation of user body heat and/or nose temperature using infrared techniques. The dynamic questions can be based on personal and financial information for the user, purchasing history, geographical location, travel history and other personal user information. The analysis of answers to the static questions can be based on a voice print of the user. The static questions can be arbitrary questions asked of the user. A voice print can be made of the user's answers to the static questions. An authentication based on the static questions can be comprise asking the user the static questions again and comparing the user's answers with the previously obtained voice print. Other features of the behavioral authentication, the dynamic questions and the static questions are possible.

In addition, an extent to which the user is authenticated can depend on a type of transaction the user is attempting. For example for financial transactions that do not involve a transfer of money, for example checking the user's account balance, a threshold for the authentication trust score can be lower than for a financial transaction that does involve a transfer of money. More authentication checks and questions may be asked of the user to authenticate the user for a financial transaction involving a transfer of money.

Another factor in determining an extent to which the user is authenticated can be a geographical location of the user. When the user is determined to be in a safe zone, that is an area that is known and familiar to the user and the financial institution, fewer authentication questions and tests may need to be used to authenticate the user than if the user was determined to be in an unfamiliar area. Examples of safe zones can include the user's home, the user's office and a travel route in which the use normally travels from home to work. Examples of unsafe zones can include a different geographical area, for example when the user is traveling out of city, state or country, or when the user travels from home to work using a route different from one than the user normally takes. Other examples of safe and unsafe zones are possible.

A calculation of an authentication trust score for a particular operation can take into account a context for the operation. The context can comprise a type of transaction the user is attempting and a current geographical location of the user. For example, when the operation comprises a financial transaction such as transferring money, a context of this type of transaction from a user's home can result in a higher authentication trust score than a context of this type of transaction from the user's automobile.

In an example implementation, different threshold levels can be used based on an operation being requested by the user. For example, a first threshold level can be used for a basic login in the electronic computing device. For example, the basic login can permit the user to check an account balance. However, once logged in, when the user wants to perform an operation involving a transfer of money, such as withdrawing funds or transferring money from one account to another, the authentication trust score may need to exceed a second threshold level that is higher than the first threshold level. When the authentication trust score is high enough to permit login but is not high enough to permit a transfer of funds, additional authentication may be needed from the user. For example, additional authentication based on one or more of answers to dynamic questions, static questions and information from biometric data may be needed to further authenticate the user.

The methods described above for user authentication can be dynamically varied based on what is known about the user. For example, when authenticating a new user for which little is known about the user's activities, simple biometrics (such as a voice analysis or an analysis of facial gestures) may be used to authenticate the user. However, as more is learned about the user, the systems and methods can intelligently and dynamically vary authentication factors so that authentication can become more seamless and unobtrusive to the user. For example, static and dynamic questions asked of the user can be dynamically varied based on user answers to these questions and based on knowledge gained regarding user activities.

In this disclosure, the system and methods are described with respect to a financial organization. However, the systems and methods can also be used for other types of organizations. For example the systems and methods can be used to permit user authentication for login to computer systems of organizations such as a public library, a medical center, a local theater, an orchestra, an airline and a restaurant reservation service. Other organizations are possible.

The systems and methods disclosed herein are directed to a computer technology that significantly improves a remote login process for users. Instead of having users of mobile electronic computing devices have to manually enter user ID and password information to be authenticated for login to a server computer, the systems and methods permit automatic authentication based on an analysis of information regarding a location of the user, a proximity of the user to an IOT device, a user activity pattern and profile information for the user. The systems and methods also provide for a flexible authentication process based on a level of trust in an evaluation of the user's identity. The flexible authentication process permits additional levels of authentication processing when needed to ensure a valid user authentication.

FIG. 1 shows an example system 100 that supports enhanced secure authentication. The example system 100 includes a mobile electronic computing device 102, IOT devices 104, IOT server computers 106, a network 108, a financial institution server computer 110 and a database 114. Financial institution server computer 110 includes a trust score authentication module 112. More, fewer or different components can be used.

The example mobile electronic computing device 102 is a mobile device such as a smart phone, a tablet computer, laptop computer, a smart watch or other device which is portable and from which the user can log into financial institution server computer 110. The mobile electronic computing device 102 includes a financial institution software application from which the user can login to a user account at a financial institution. The mobile electronic computing device 102 also includes GPS functionality. More than one mobile electronic computing device 102 can be used. In this disclosure, the terms mobile electronic computing device and smart phone are used interchangeably.

The example IOT devices 104 comprise one or more physical objects that are embedded with one or more of electronics, software, sensors and network connectivity to allow the physical objects to exchange data. In this disclosure, an IOT device is also referred to as an embedded electronic device. Each of the TOT devices 104 can communicate with TOT server computers 106, with financial institution server computer 110 and with other server computers over network 108. In addition, each of the TOT devices 104 can communicate with a nearby mobile electronic computing device 102 using a short-distance communication methodology such as Bluetooth or near-field communication (NFC). As discussed in more detail later herein, one or more tokens transferred between financial institution server computer 110, the user's smart phone, an TOT device 104 and an TOT server computer 106 can be used to authenticate a user of the mobile electronic computing device 102 at a location of the TOT device 104.

The example IOT server computers 106 are server computers associated with IOT devices 104. For example, when an IOT device 104 is an IOT sensor for a home thermostat, a corresponding IOT server computer 106 can be a server computer for the thermostat manufacturer. When an IOT device 104 is an IOT sensor for an automobile, a corresponding IOT server computer 106 can be a server computer for the automobile manufacturer. When an IOT device 104 is an IOT sensor for a microwave oven, a corresponding TOT server computer 106 can be a server computer for the microwave oven manufacturer. Other examples are possible. As discussed in more detail later herein, one or more tokens that can be used for authenticating a user can be sent from financial institution server computer 110 to the user's smart phone, to an TOT device 104 and to a corresponding TOT server computer 106. The TOT server computer 106 can then send the one or more tokens to financial institution server computer 110 to authenticate the user.

The example network 108 is a network is a computer network that can permit communication between one or more of mobile electronic computing device 102, IOT devices 104, IOT server computers 106, financial institution server computer 110 and any other server computer or other electronic computing device accessible from network 108. For example system 100, network 108 is the Internet.

The example financial institution server computer 110 is a server computer at a financial institution. Financial institution server computer 110 can include or provide access to one or more financial accounts at the financial institution. In some implementations, financial institution server computer 110 includes all functionality needed to implement an authentication of a user at mobile electronic computing device 102. In other implementations, some of the needed functionality can be included on other server computers accessible from network 108 and not shown in FIG. 1.

The example trust score authentication module 112 can calculate a trust score as a way to authenticate a user to access a user account on financial institution server computer 110. As stated earlier herein and as explained in more detail later herein, the trust score comprises components based on an IOT device authenticator, a component based on answers to dynamic questions, a component based on answers to static questions and a component due to behavioral biometric data. The trust score for a user can determine whether the user is authenticated for login a user account at the financial institution.

The example database 114 is a database of the financial institution that is accessible from financial institution server computer 110. Database 114 can store a customer profile for the user at the financial institution and can store financial account information for the user. Additional types of user information can be stored on database 114.

Figure 2:
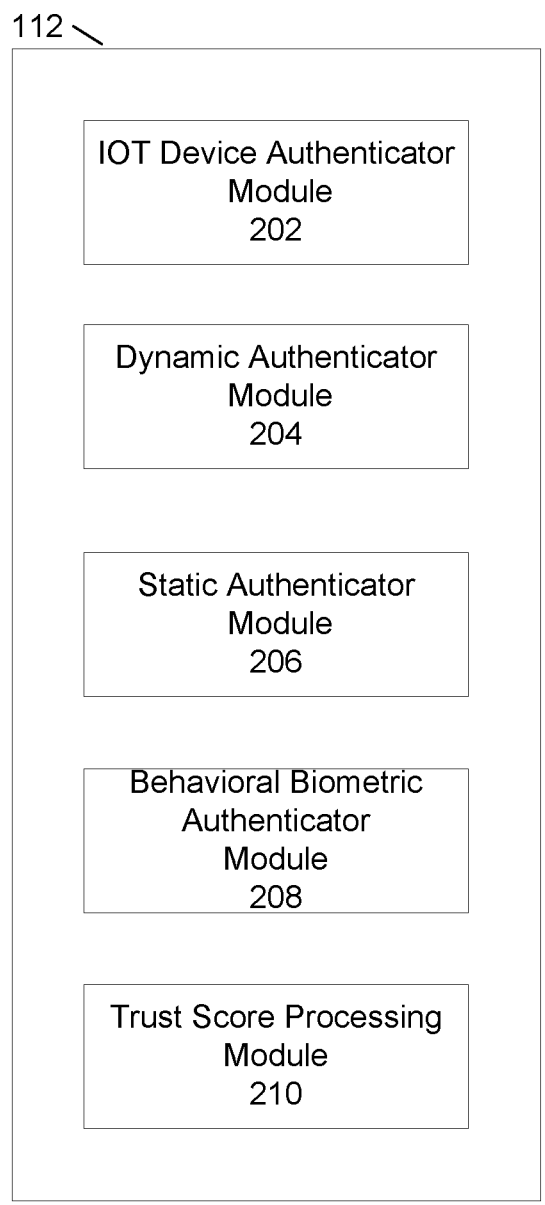
FIG. 2 shows example modules of the trust score authentication module of FIG. 1.

FIG. 2 show example modules 200 of the trust score authentication module 112. The example trust score authentication module 112 includes an IOT device authenticator module 202, a dynamic authenticator module 204, a static authenticator module 206, a behavioral biometric authenticator module 208 and a trust score processing module 210. More, fewer or different modules can be used.

The example IOT device authenticator module 202 can use one or more of IOT devices 104 to authenticate the user. In an example implementation, when the user attempts to login to the user's account on financial institution server computer 110, the financial institution server computer 110 can send a token to the user. The token can include a unique identifier for the user along with other information such as the user's account number, an identifier for the financial institution and an identifier for a login session between the mobile electronic computing device 102 and the financial institution server computer 110. Additional or different information for the token is possible.

When the user receives the token, the user can send the current GPS location of the user to the financial institution server computer 110. The user can send the current GPS position using the user's smart phone. The user can then identify a nearby IOT device 104 and move to close proximity with the identified IOT device 104. For example, when the user is at home, the user can move to close proximity with an IOT device 104 on or in the user's furnace thermostat, refrigerator, microwave oven or other similar device. When the user is away from home, for example when the user is driving, the user may already be in close proximity with an TOT device 104 in the user's automobile.

A short-range communication session using Bluetooth or NFC can then be established between the user's smart phone and the TOT device 104 identified by the user. The token can be transferred from the user's smart phone to the identified IOT device 104 using the short-range communication session. The identified IOT device 104 can then send the token to an IOT server computer 106 corresponding to the identified IOT device 104. For example, if the identified IOT device 104 is a microwave oven, the token can be sent to a website of a manufacturer of the microwave oven.

The token sent from the IOT device 104 to the IOT server computer 106 can include a unique identifier for the IOT device 104 (such as a serial number of the IOT device 104). As part of a pre-configuration process using the user's smart phone, the user can identify IOT devices the user wants to use for authentication and register these TOT devices with the financial institution server computer 106. For example, as part of the TOT configuration process, the user can move to close proximity of a selected TOT device, establish a short-term communication (such as Bluetooth or NFC) with the selected TOT device and have the serial number of the selected TOT device transferred to the user's smart phone. The serial number can then be transferred from the user's smart phone to the financial application server computer 106. The financial institution server computer 106 can maintain a list of registered TOT devices for the user along with the associated serial number of the TOT device.

When the TOT server computer 106 receives the token, the TOT server computer 106 can establish a communication session over network 108 with the financial institution server computer 110. The TOT server computer 106 can obtain a URL of the financial institution server computer 110 from the received token. When the communication session is established, TOT server computer 106 can send the token to financial institution server computer 110. When financial institution server computer 110 receives the token, financial institution server computer 110 can compare the token with the token that financial institution server computer 110 sent to the user's smart phone when the user attempted to login to financial institution server computer 110. The TOT server computer 106 can obtain the serial number of the TOT device from the token and verify that the serial number corresponds to an TOT device registered for the user. When the unique identifier in the token that financial institution server computer 110 sent to the user's smart phone matches the unique identifier in the token the financial institution server computer 110 received from the IOT server computer 106 and when the IOT device is determined to be one registered for the user's home (for example attached to a microwave), the financial institution server computer 110 can make a determination that the user is at home. In some implementations, the IOT device 104 can send the token directly to financial institution server computer 110.

The IOT device authenticator module 202 can calculate a first partial authentication score that can be used to authenticate the user at the financial institution server computer 110. The first partial authentication trust score is an authentication trust score calculated based, in part, on a user interaction with an IOT device. A determination as to whether the user can be authenticated based on the first partial authentication trust score can be flexible based on several factors including a profile of the user, past transactions made by the user, credit history of the user, a location of the user and a type of financial transaction being attempted by the user. More, fewer, or different factors can be used to determine whether the IOT device authenticator module 202 can authenticate the user based on the first partial authentication trust score.

The IOT device authenticator module 202 can calculate the first partial authentication trust score based on IOT device data and based on a type of financial transaction that the user is attempting to make at the financial institution. The first partial authentication trust score can be higher when the user is confirmed to be in a safe zone, i.e. a location known or familiar for the user. When the user is confirmed to be in the user's home, the first partial authentication trust score can be higher than if the user were at a location where the user does not normally occupy. For example, when the user is confirmed to be at home or at work, the first partial authentication trust score can be higher than if the user is at a restaurant that the user does not normally frequent.

Similarly, when the financial transaction that the user is attempting to make does not involve a transfer of money, for example when the user simply wants to check an account balance, the first partial authentication score can be higher than when the user wants to withdraw money or transfer money from one account to another account.

Depending on the IOT data and the type of financial transaction the user is attempting to make, the first partial authentication trust score can be used to authenticate the user at the financial institution server computer 110 without any additional authentication being done. For example, when the user is confirmed to be at home, at work, driving to work or at some location or route that is known to be used by the user and the financial transaction is one that does not involve a transfer of funds, the first partial authentication trust score can be used to authenticate the user. However, when either the user is not confirmed to be at a location or route that is known to be used by the user or when the financial transaction is one that does involve a transfer of money, additional authentication methods may need to be used in order to authenticate the user.

The example dynamic authenticator module 204 can calculate a second partial authentication trust score based on dynamic questions that can be asked of the user. The dynamic questions can be based on a current activity of the user, a history of user transactions at the financial institution, a profile of the user and other information that would be only known to the user. The second partial authentication trust score comprises a revised authentication trust score based on the first partial authentication trust score. One or more dynamic questions can be asked of the user. In addition, the dynamic authenticator module 204 can purge a dynamic question and generate a new dynamic question. Some examples of dynamic questions can include questions regarding a current value of the user's mortgage, a name of a product recently purchased by the user, a make and model of the user's automobile, a name and address of the user's employer. Other similar dynamic questions can be asked.

Based on answers to the dynamic questions the second partial authentication trust score can be calculated. In an example implementation, each dynamic question can have a specific point value. The second partial authentication trust score can be calculated by adding the point values for each dynamic question answered correctly. The second partial authentication trust score can then be added to the first partial authentication trust score and a determination can be made whether a revised authentication trust score comprising a sum of the first partial authentication trust score and the second partial authentication trust score is greater than the threshold. When a determination is made that the revised authentication trust score is greater than the threshold, the user can be authenticated. However, when a determination is made that the revised authentication trust score is not greater than the threshold, the user is not authenticated and additional methods of authentication are used.

The example static authenticator module 206 can calculate a third partial authentication trust score based on answers to static questions or other static mechanisms. Example static questions can include "what is your name", "what is your address", "where were you born," etc. In an example implementation, the user can pre-record answers to the static questions and a voice print can be made of the user's voice. The user's answers to the static questions can be compared with the voice print and the third partial authentication trust score can be based on whether the user's voice in answering the static questions matches the voice print.

The third partial authentication trust score can be added to the sum of first partial authentication trust score and the second partial authentication score to generate a second revised authentication trust score. When the second revised authentication trust score is greater than the threshold, the user can be authenticated. However, when the second revised authentication trust score is not greater than the threshold, the user is not authenticated.

The example behavioral biometric authenticator module 208 can calculate a fourth partial authentication trust score based on one or more biometric methods. Example biometric methods can include voice prints, facial recognition, writing recognition and body temperature analysis. Other biometric methods are possible.

Regarding voice prints, a profile can be created of a user's voice. For example, a voice recording can be made of the user speaking certain selected sentences or phrases. During a voice print authentication of the user, the user can be prompted to speak one or more of the selected sentences or phrases. The user's voice while speaking the one or more of the selected sentences or phrases can be compared to the profile voice print of the user. When a determination is made that the user's voice matches the voice prints, the user can be authorized to login to a user account at the financial institution.

Regarding facial recognition, a profile can be created of the user's facial mannerisms. For example, a recording can be made of the user yawning, smiling, blinking an eye, etc. During a facial recognition authentication, the user can use a camera on the user's smart phone to record the user repeating the facial mannerisms in the profile. The facial mannerisms recorded by the camera can then be compared with the facial mannerisms in the profile to authenticate the user.

Regarding writing recognition, the user can write one or more words, for example in lower case, and a profile can be created of the user's handwriting. During a writing recognition, the user can write one or more of these words and the user's handwriting can be compared with the profile. In one implementation, the user's handwriting profile can be created using an application of the user's smart phone. A stylus, or in some cases the user's fingers can be used to write the one or more words. During an authorization based on writing recognition, the user can be authorized by writing the one or more words again using the application on the smart phone and sending the writing sample to financial institution server computer 110 for comparison with the user's handwriting profile.

Regarding authentication using body temperature analysis, a profile of the user's body heat and nose temperature can be created using infrared techniques. The profile of the user's body heat and nose temperature can be compared with a current measurement of the user's body heat and nose temperature to authenticate the user. For example, the user can carry a portable infrared sensor that can be used to obtain a measurement of the user's body heat and/or nose temperature. This current measurement can be sent to the user's smart phone via a short distance communication method such as Bluetooth and then sent to the financial institution server computer 112 for comparison with the user's handwriting profile. Other body temperatures can be used, for example mouth temperature or ear temperature.

The fourth partial authentication trust score can be added to the sum of first partial authentication trust score, the second partial authentication trust score and the third partial authentication trust score to generate a third revised authentication trust score. When the third revised authentication trust score is greater than the threshold, the user can be authenticated. However, when the third revised authentication trust score is not greater than the threshold, the user is not authenticated.

The example trust score processing module 210 calculates the trust authentication score to determine whether to authenticate the user. In the example implementation described above, the trust score processing module 210 calculates the first partial authentication trust score, the second partial authentication trust score, the third partial authentication trust score the fourth partial authentication trust score and adds these three partial authentication trust scores to arrive at an overall trust authentication score.

In some implementations, the fourth partial authentication trust score involving biometrics can be calculated before the third partial authentication trust score involving answers to static questions. In other implementations, an overall trust authentication score can be calculated using only a sum of the first partial authentication trust score, the second partial authentication trust score and the third partial authentication trust score or a using only a sum of the first partial authentication trust score, the second partial authentication trust score and the fourth partial authentication trust score.

In still other implementations, the trust authentication score may be calculated differently—for example, the trust authentication score can be calculated based on the IOT device authenticator module 202 and added to incrementally based on data from the dynamic authenticator module 204, the static authenticator module 206 and the behavioral biometric authenticator module 208. In these implementations, all or part of the overall trust authentication score can be calculated within the IOT device authenticator module 202, the dynamic authenticator module 204, the static authenticator module 206 and the behavioral biometric authenticator module 208.

When a determination is made that the overall trust authentication score is greater than the threshold, the user is authenticated to login to the financial institution server computer 110. However, when the overall trust authentication trust score is not greater than the threshold, the user is not permitted to login. At this point the user may be asked to provide a user ID and password in order to be authenticated.

In an example implementation, the threshold for determining whether the user can be authenticated can be a number like 100. In this implementation, when a calculation of the authentication trust score or the revised authentication trust score produces a number greater or equal to 100, the user can be authenticated. In other implementations, thresholds can be used.

Figure 3:
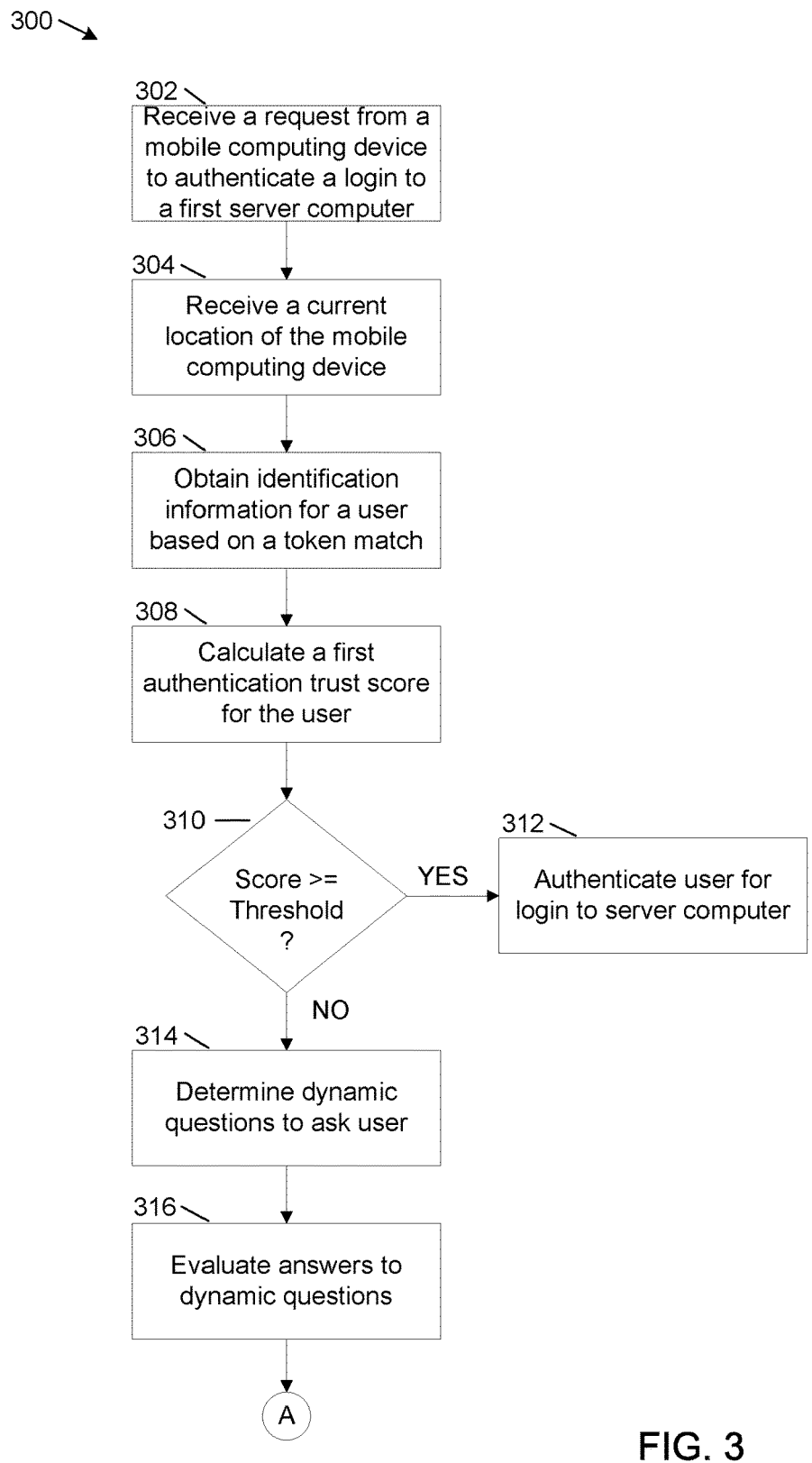
FIG. 3 shows a flowchart of a part of an example method for secure authorization.
Figure 4:
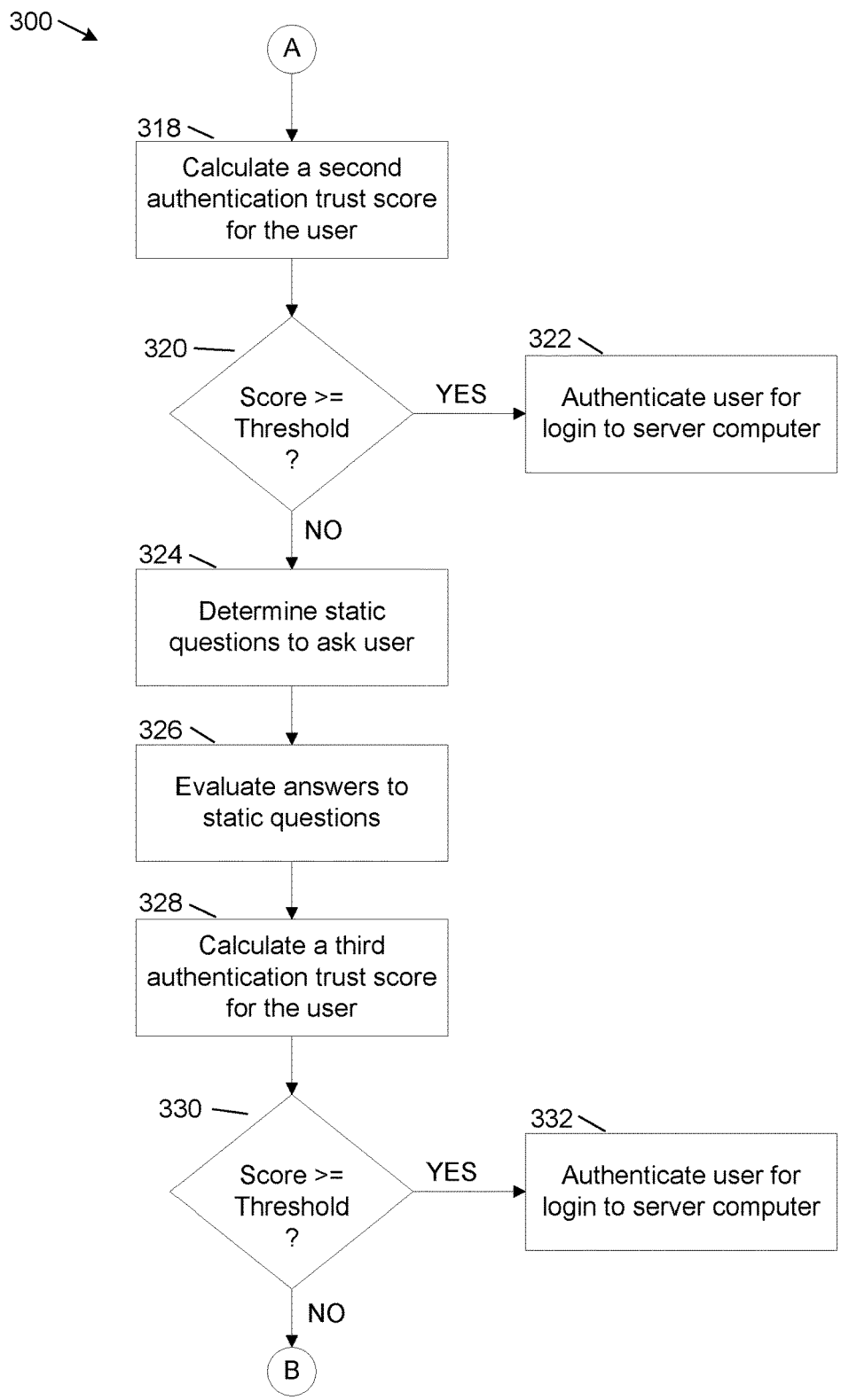
FIG. 4 shows a flowchart of another part of the example method for secure authorization of FIG. 3.
Figure 5:
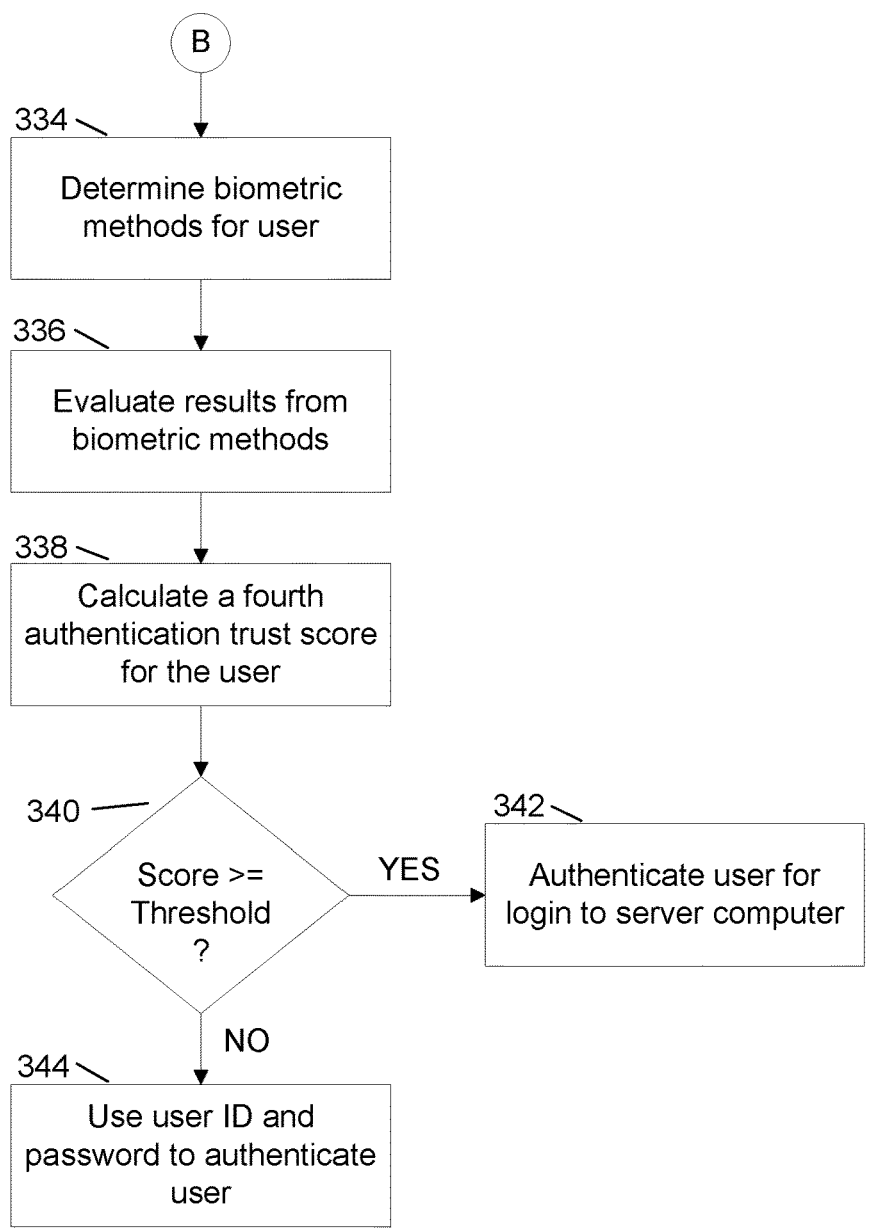
FIG. 5 shows a flowchart of yet another part of the example method for secure authorization of FIGS. 3 and 4.

FIG. 3 shows a flowchart of an example method 300 for authenticating a user for login to a server computer. For method 300, the server computer is financial institution server computer 110. Also, for method 300 the user attempts to login to financial institution server computer 110 from mobile electronic computing device 102. For method 300, the mobile electronic computing device 102 is one for which the user may not want to enter a user ID or password to login, such as a smart phone or smart watch. For the discussion below, the mobile electronic computing device is referred to as the smart phone.

At operation 302, a request is received at financial institution server computer 110 from a smart phone to authorize a user of the smart phone to login to financial institution server computer 110. The request can be initiated through a financial institution software application running on the smart phone. The request can either be initiated by having the user click on an appropriate icon or button on the smart phone or via a voice command. When the request is initiated by the icon or button on the smart phone, the request is initially to login to the financial institution server computer. However, when the request is initiated by a voice command, the request can also specify other actions in addition to logging in, for requesting an account balance or requesting a transfer of funds between accounts.

At operation 304, the financial institution server computer 110 receives a current location of the smart phone. The smart phone uses GPS functionality to send a GPS position of the smart phone to financial institution server computer 110.

At operation 306, the financial institution server computer 110 receives identification information for the user based on a token match. As discussed in more detail, with reference to FIG. 6, when the login request is received at operation 302, the financial institution server computer 110 sends a token to the smart phone. The token can comprise a plurality of fields included in a message from financial institution server computer 110 to the smart phone. The plurality of fields can include information such as identification information for the financial institution server computer 110, including a URL by which the financial institution server computer 110 can be accessed, an identifier for the user, such as a user ID for the user at the financial institution, an identifier for a communication session between the smart phone and the financial institution server computer 110 and other information.

As discussed in more detail with reference to FIG. 6, the token (or a different token that includes the identification information for the user) can be passed to an embedded device (an IOT device), passed from the embedded device to a server computer associated with the embedded device and passed back to financial institution server computer 110 via a communication session between the server computer associated with the embedded device and financial institution server computer 110. The token match can occur when information in the token received by the financial institution server computer 110 at operation 302, matches information in the token sent to the smart phone by financial institution server computer 110. The token match verifies an identity and location of the user.

At operation 308, a first authentication trust score is calculated for the user. The first authentication trust score is a numerical value, for example a number from 1 to 100. The first authentication trust score is calculated based on a verification of the location of the user and a verification of an identity of the user, based on the use of an IOT device. The higher the confidence of the identity of the user, the higher the authentication trust score. When the user is determined to be in a safe zone, as discussed earlier herein, the first authentication trust score can be higher that when the user is determined to be in an untrusted area.

Some examples of how the first authentication trust score can be calculated can include a determination that the user is at home, a determination that the user is driving to work via a route normally used by the user and a determination that the user is driving on a route that is not normally used by the user. A determination can be made that the user is at home by having the user exchange the token received from the financial institution server computer 110 with an IOT device in the user's home. For example, the user can use NFC or Bluetooth to exchange the token with an IOT device on a furnace, microwave, refrigerator or other IOT device in the user's home. A determination can be made that the user is driving to work by having the user exchange the token with an IOT device in the user's automobile. Once the token is exchanged, GPS location regarding the route can be sent to financial institution server computer 110 from the user's smart phone or from the IOT device. The financial institution server computer 110 can track a route for the user and determine whether the route is a known route, such as a route by which the user normally drives to work, or an unfamiliar route.

The trust score authentication module 112 calculates the first authentication trust score based on a level of confidence regarding a verification of an identity of the user. For example, when a determination is made that the user is at home, the first authentication trust score can be a relatively high value, such as 60. When a determination is made that the user is driving to work, the first authentication trust score can also be a relatively high value such as 60. However, when a determination is made that the user is driving an unfamiliar route, the first authentication trust score can be a lower value, for example 40.

At operation 310, a determination is made as to whether the first authentication trust score is greater or equal to a threshold. A plurality of different thresholds can be used based on an activating action by the user. The activating action can comprise a command spoken by the user to initiate the login process. For example, when the user says words similar to "login to my financial account," the threshold can be lower than if the user says words similar to "what is my account balance at the bank?" or "transfer $1,000 from my savings account to my checking account." As an example, a threshold for simply logging in can be 60, a threshold for checking an account balance can be 80 and a threshold for transferring funds can be 100.

When a determination is made at operation 310 that the first authentication trust score is greater or equal to the threshold, at operation 312, the user is authorized to login to the server computer. In addition, if the user requests a check of an account balance and the first authentication trust score is greater or equal to the threshold for checking balances, the user is authorized to check his/her account balance. Similarly, if the user requests a transfer of funds and the first authentication trust score is greater or equal to the threshold for transferring funds, the user is authorized to transfer funds. However, generally, the first authentication trust score is not high enough to permit actions other than logging in to the user's account. For other actions, or when the first authentication trust score is not high enough to authorize a login, other information is required from the user.

At operation 310, when a determination is made that the first authentication trust score is not greater or equal to the threshold, at operation 314, a determination is made as to which dynamic questions to ask the user. The determination of which dynamic questions to ask the user can be based on the current location for the user from operation 304 and the obtained identification information for the user from operation 306. The dynamic questions are personalized for the user in an attempt to obtain additional information that can be used to authenticate the user. As discussed earlier herein, a dynamic question is one that can be based on personal and financial information for the user, purchasing history, geographical location, travel history and other personal user information. Some examples of dynamic questions can include questions regarding a current value of the user's mortgage, a name of a product recently purchased by the user, a make and model of the user's automobile, a name and address of the user's employer. For example, if the user has a mortgage at the financial institution, the user can be asked to provide or state a value of a monthly mortgage payment. As another example, if the user has made a recent purchase using a bank credit card, the user can be asked to provide or state the amount of the purchase.

At operation 316, answers obtained from the user to the dynamic questions are evaluated. Based on the evaluation of the answers, one or more additional dynamic questions may be asked of the user.

At operation 318, a second authentication trust score is calculated. The second authentication trust score is calculated based all or in part on the answers to the dynamic questions. In some implementations, a partial authentication trust score is calculated based solely on the dynamic questions. The partial authentication trust score is then added to the first authentication trust score to obtain the second authentication trust score. In other implementations, the second authentication trust score comprises the first authentication trust score revised based on the evaluation of the answers to the dynamic questions. Because the second authentication trust score is based on more information than the first authentication trust score, the second authentication trust score is generally higher than the first authentication trust score.

At operation 320, a determination is made as to whether the second authentication trust score is greater or equal than the threshold. When a determination is made that the second authentication trust score is greater or equal than the threshold, at operation 322, the user is authenticated to login to financial institution server computer 110.

At operation 320, when a determination is made that the second authentication trust score is not greater or equal than the threshold, at operation 324, a determination is made as to what static questions to ask the user. As discussed earlier herein, static questions can be arbitrary questions asked of the user. A voice print can be made of the user's answers to the static questions. An authentication based on the static questions can be comprise asking the user the static questions again and comparing the user's answers with the previously obtained voice print. Example static questions can include "what is your name", "what is your address", "where were you born," etc.

At operation 326, the user's answers to the static questions are evaluated by comparing the user's answers to the previously obtained voice prints.

At operation 328, a third authentication trust score is calculated. The third authentication trust score is calculated based all or in part on the answers to the static questions. In some implementations, a partial authentication trust score is calculated based solely on the static questions. The partial authentication trust score is then added to the second authentication trust score to obtain the third authentication trust score. In other implementations, the third authentication trust score comprises the second authentication trust score revised based on the evaluation of the answers to the static questions. Because the third authentication trust score is based on more information than the second authentication trust score, the third authentication trust score is generally higher than the second authentication trust score.

At operation 330, a determination is made as to whether the third authentication trust score is greater or equal than the threshold. When a determination is made that the third authentication trust score is greater or equal than the threshold, at operation 332, the user is authenticated to login to financial institution server computer 110.

At operation 330, when a determination is made that the third authentication trust score is not greater or equal than the threshold, at operation 334, a determination is made as to which biometric methods to implement for the user. As stated earlier herein, biometric methods can include voice prints, facial recognition, writing recognition and body temperature analysis. For example, the biometric methods can include an analysis of a facial movement of the user such as a yawn, a smile and an eye blink, an analysis of how the user writes a particular word and an evaluation of user body heat and/or nose temperature using infrared techniques. Other biometric methods are possible.

At operation 336 results from the biometric methods are evaluated.

At operation 338, a fourth authentication trust score is calculated. The fourth authentication trust score is calculated based all or in part on the evaluation from the biometric methods. In some implementations, a partial authentication trust score is calculated based solely on the biometric methods. The partial authentication trust score is then added to the third authentication trust score to obtain the fourth authentication trust score. In other implementations, the fourth authentication trust score comprises the third authentication trust score revised based on the evaluation of the user response to the biometric methods. Because the fourth authentication trust score is based on more information than the third authentication trust score, the fourth authentication trust score is generally higher than the third authentication trust score.

At operation 340, a determination is made as to whether the fourth authentication trust score is greater or equal than the threshold. When a determination is made that the fourth authentication trust score is greater or equal than the threshold, at operation 342, the user is authenticated to login to financial institution server computer 110.

At operation 340, when a determination is made that the fourth authentication trust score is not greater or equal than the threshold, at operation 344, the user enters a user ID and password to authenticate the user for login at financial institution server computer 110.

Figure 6:
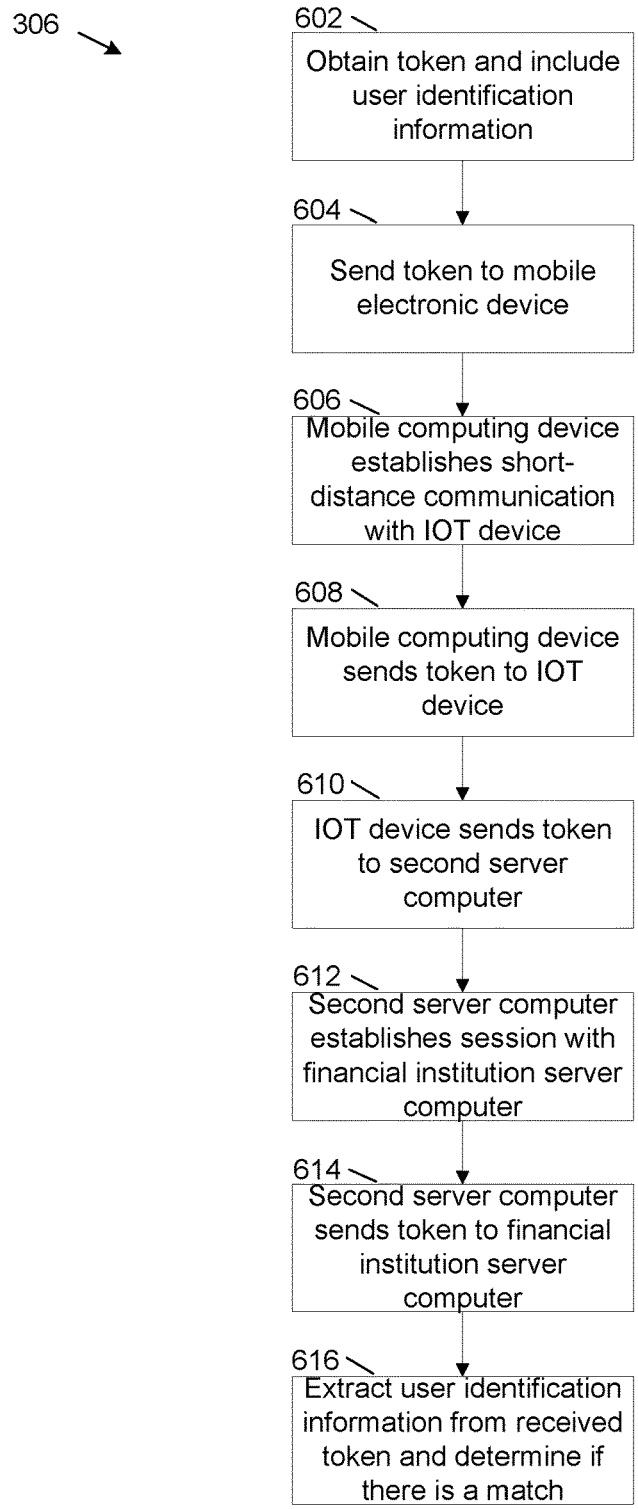
FIG. 6 shows a flowchart of an example operation from FIG. 3.

FIG. 6 shows a flowchart that provides details for the example operation 306 for obtaining information from the user based on a token match.

At operation 602, a token is created at the financial institution server computer 110 and user identification information is inserted in the token. As stated earlier herein, the token can comprise a plurality of fields included in a message from financial institution server computer 110 to the smart phone. The plurality of fields can include information such as identification information for the financial institution server computer 110, including a URL by which the financial institution server computer can be accessed, an identifier for the user, such as a user ID for the user at the financial institution and an identifier for a communication session between the smart phone and the financial institution server computer 110. Other information is possible.

At operation 604, the token is sent to the smart phone. For example, the token can be included in a message that is sent from financial institution server computer 110 to the smart phone.

At operation 606, the user establishes a short-distance communication between the smart phone and an IOT device. The short-distance communication can be established by using a short-distance communication protocol such as Bluetooth, NFC or a similar short-distance communication protocol. The IOT device can be one that is nearby the user. For example, if the user is at home, the IOT device can be an IOT device embedded in a household device or appliance such as a thermostat, a refrigerator or a microwave. If the user is driving an automobile, the IOT device can be an IOT device embedded within the automobile. In an example implementation, the data distribution service (DDS) can be used to handle communication between the smart phone and the IOT device. In other implementations, other communication protocols can be used.

At operation 608, the smart phone sends the token to the IOT device using the established short-distance communication session.

At operation 610, the IOT device sends the token to a server computer associated with the IOT device. For example, if the IOT device is an embedded sensor device for a thermostat, the IOT device can send the token to a server computer for a manufacturer of the thermostat. The IOT device can include a software application that can detect a token in communication received at the IOT device and automatically send the token to the server computer of the manufacturer of the IOT device or to a server computer associated with the IOT device in some other manner. In some implementations, the IOT device can include the token in a message between the IOT device and the server computer. In other implementations, the IOT device can create a new token, including information from the token received from the smart phone, and send the new token in a message to the server computer. In an example implementation, a communication protocol like the message queue telemetry transport (MATT) protocol can be used to transmit a token from the IOT device to the server computer associated with the IOT device. In other implementations, other communication protocols can be used.

At operation 612, the server computer associated with the IOT device establishes a communication session with financial institution server computer 110. For example, the communication session can be established via a connection to a URL address of the financial institution server computer 110. The URL address can be included as part of the user information that is included in the token sent to the server computer associated with the IOT device. In an example implementation, the server to server advanced message queuing protocol (AMQP) can be used in the communication session. In other implementations, other communication protocols can be used.

At operation 614, the server computer associated with the IOT device sends the token to financial institution server computer 110. In some implementations, the token that is sent is the same token received by the server computer associated with the IOT device. In other implementations, a different token is sent. However, when a different token is sent, the different token includes the user identification information sent from the IOT device and received at financial institution server computer 110.

At operation 616, financial institution server computer 110 extracts the user identification information from the token sent by the server computer associated with the IOT device. The financial institution server computer 110 then determines whether the user identification information received matches the user information originally sent from financial institution server computer to the smart phone. A match can be detected when there is a match between common information. For example, if a user ID and a session ID were both included in the user information sent to the smart phone, a match is detected when the token received at financial institution server computer 110 from the server computer associated with the IOT device includes the same user ID and session ID.

Figure 7:
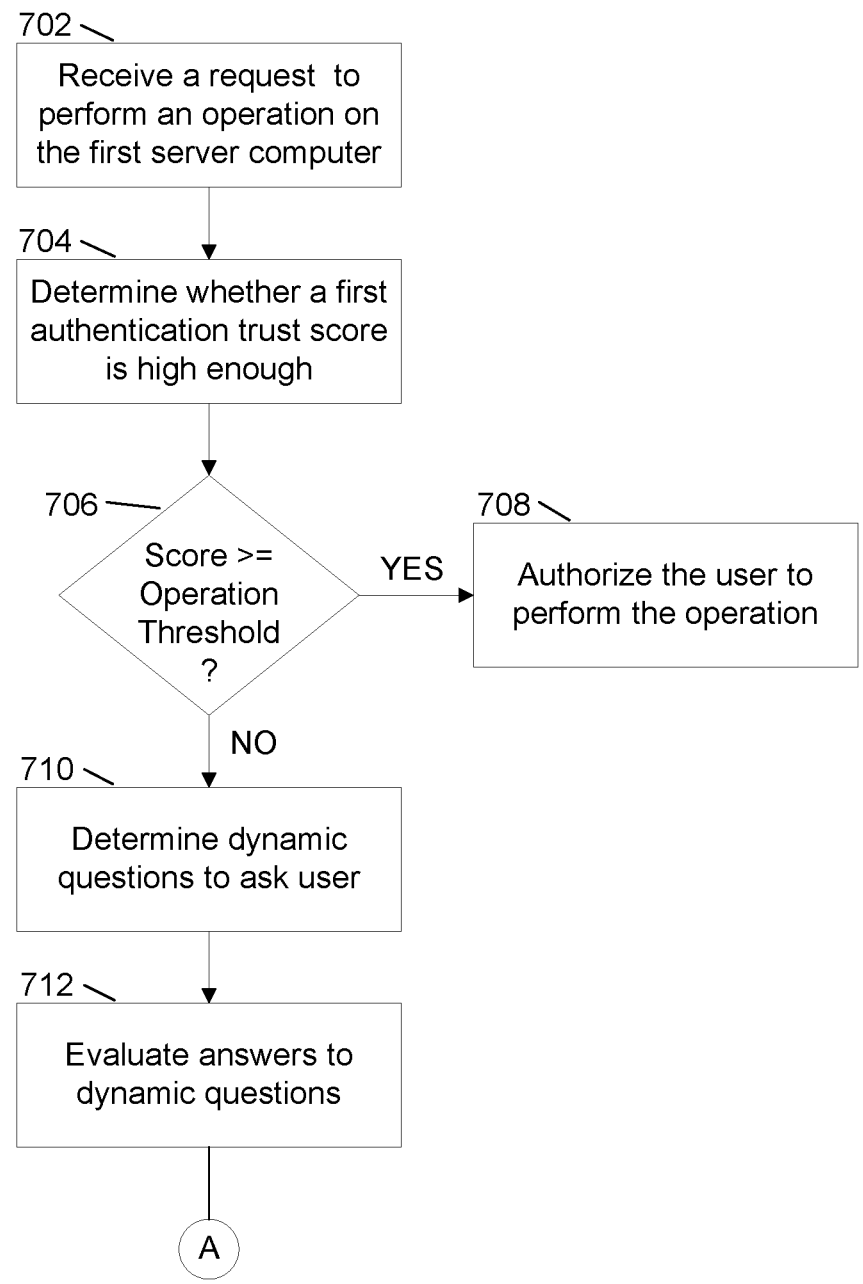
FIG. 7 shows a flowchart of a part of an example method for authenticating a user to perform an operation.
Figure 8:
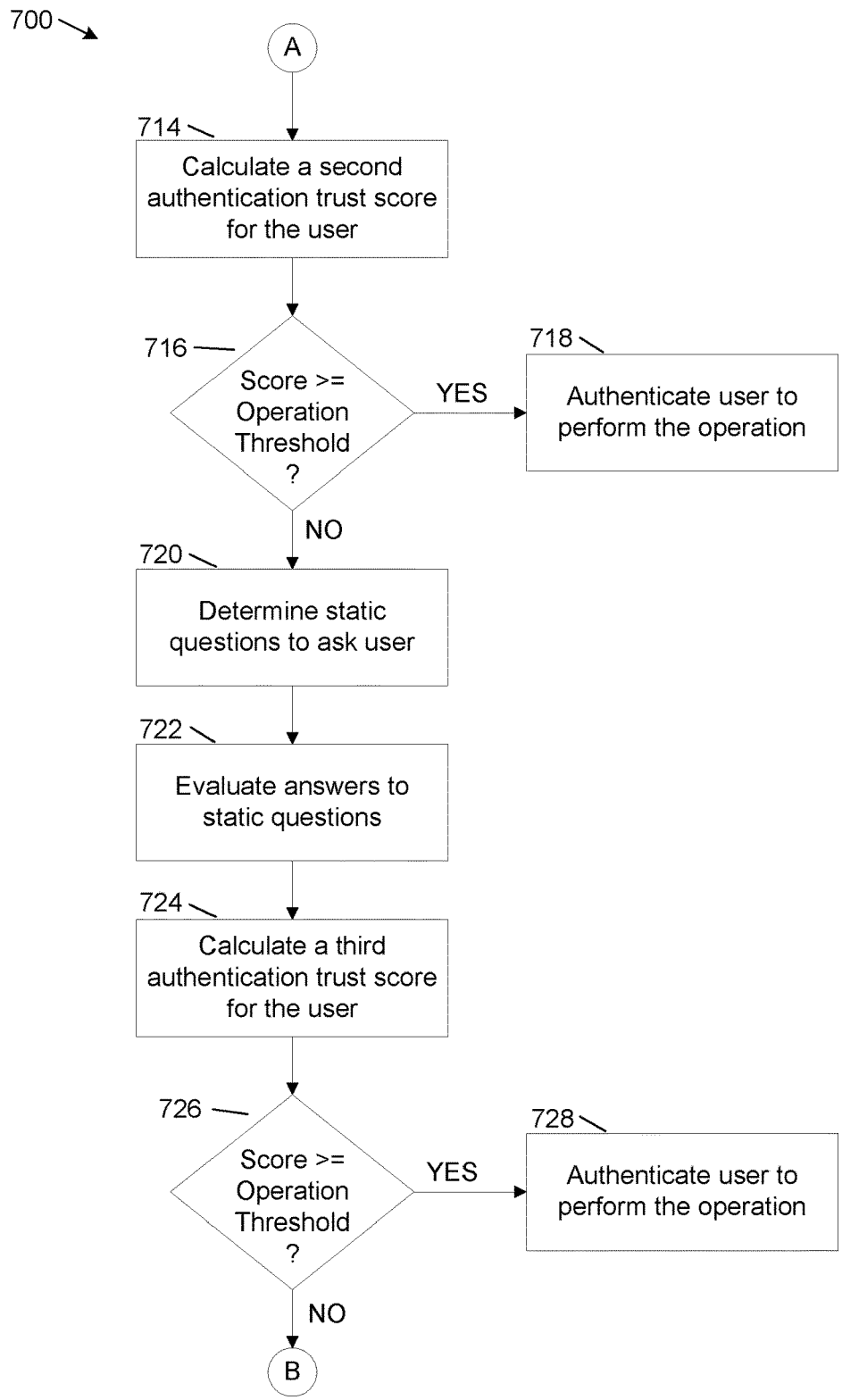
FIG. 8 shows a flowchart of another part of the example method for authenticating the user to perform an operation of FIG. 3.
Figure 9:
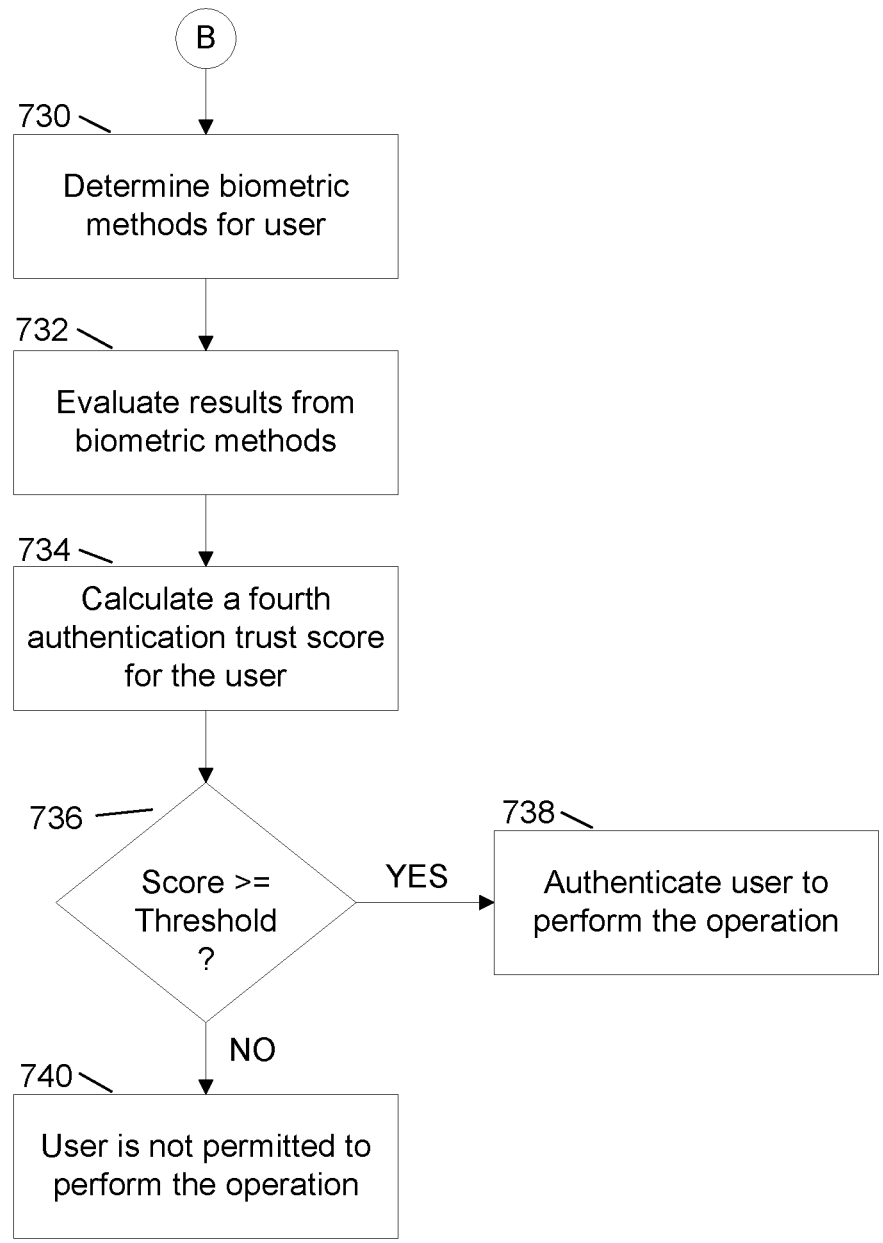
FIG. 9 shows a flowchart of yet another part of the example method for authenticating the user to perform the operation of FIGS. 3 and 4.

FIG. 7 shows a flowchart of an example method 700 for authenticating a user for an operation to be performed on financial institution server computer 110. For method 700, the user is already logged in to the financial application on financial institution server computer 110.

At operation 702, a request is received at financial institution server computer 110 to perform an operation on financial institution server computer 110. For example, the operation can be checking the user's account balance, transferring fund from one user account to another user account, withdrawing money for a user account, applying for a loan or another similar type of financial transaction operation.

At operation 704, a determination is made as to whether a first authentication trust score for the user is high enough to permit the user to perform the operation. The first authentication trust score is the authentication trust score that permitted the user to login to the financial institution server computer 110. Typically, this first authentication trust score permits the user to do a basic operation, such as check an account balance. However, for an operation that involves a transfer of funds or similar operation that can require additional security, a higher authentication trust score may be needed.

At operation 706, a determination is made as to whether the first authentication trust score is greater or equal to an operation threshold. The operation threshold is a threshold corresponding to the operation that the user is requesting to perform. For an operation such as checking an account balance, the threshold that was used for login can be used. However, for an operation such as transferring or withdrawing funds, a higher threshold is usually required to give permission to perform the operation.

At operation 706, when the first authentication trust score is greater or equal to the operation threshold, at operation 708, the user is authenticated to perform the requested operation.

At operation 706, when the first authentication trust score is less than the operation threshold, at operation 710, a determination is made as to which dynamic questions to ask the user, as discussed earlier herein with regard to operation 314 of method 300.

At operation 712, answers obtained from the user to the dynamic questions are evaluated. Based on the evaluation of the answers, one or more additional dynamic questions may be asked of the user.

At operation 714, a second authentication trust score is calculated. The second authentication trust score is calculated based on the first authentication threshold and on the answers to the dynamic questions. Because the second authentication trust score is based on more information than the first authentication trust score, the second authentication trust score is generally higher than the first authentication trust score.

At operation 716, a determination is made as to whether the second authentication trust score is greater or equal than the operation threshold. When a determination is made that the second authentication trust score is greater or equal than the operation threshold, at operation 716, the user is authenticated to perform the requested operation on financial institution server computer 110.

At operation 716, when a determination is made that the second authentication trust score is not greater or equal than the threshold, at operation 720, a determination is made as to what static questions to ask the user. As discussed earlier herein, static questions can be arbitrary questions asked of the user. A voice print can be made of the user's answers to the static questions. An authentication based on the static questions can be comprise asking the user the static questions again and comparing the user's answers with the previously obtained voice print. Example static questions can include "what is your name", "what is your address", "where were you born," etc.

At operation 722, the user's answers to the static questions are evaluated by comparing the user's answers to the previously obtained voice prints.

At operation 724, a third authentication trust score is calculated. The third authentication trust score is calculated based on the second authentication trust score and on the answers to the static questions. Because the third authentication trust score is based on more information than the second authentication trust score, the third authentication trust score is generally higher than the second authentication trust score.

At operation 726, a determination is made as to whether the third authentication trust score is greater or equal than the operation threshold. When a determination is made that the third authentication trust score is greater or equal than the operation threshold, at operation 728, the user is authenticated to perform the requested operation.

At operation 726, when a determination is made that the third authentication trust score is not greater or equal than the threshold, at operation 730, a determination is made as to which biometric methods to implement for the user. As stated earlier herein, biometric methods can include voice prints, facial recognition, writing recognition and body temperature analysis. For example, the biometric methods can include an analysis of a facial movement of the user such as a yawn, a smile and an eye blink, an analysis of how the user writes a particular word and an evaluation of user body heat and/or nose temperature using infrared techniques. Other biometric methods are possible.

At operation 732 results from the biometric methods are evaluated.

At operation 734, a fourth authentication trust score is calculated. The fourth authentication trust score is calculated based on the third authentication trust score and on the evaluation from the biometric methods. Because the fourth authentication trust score is based on more information than the third authentication trust score, the fourth authentication trust score is generally higher than the third authentication trust score.

At operation 736, a determination is made as to whether the fourth authentication trust score is greater or equal than the operation threshold. When a determination is made that the fourth authentication trust score is greater or equal than the operation threshold, at operation 738, the user is authenticated to perform the operation.

At operation 740, when a determination is made that the fourth authentication trust score is not greater or equal than the operation threshold, at operation 344, the user is not permitted to perform the operation.

Figure 10:
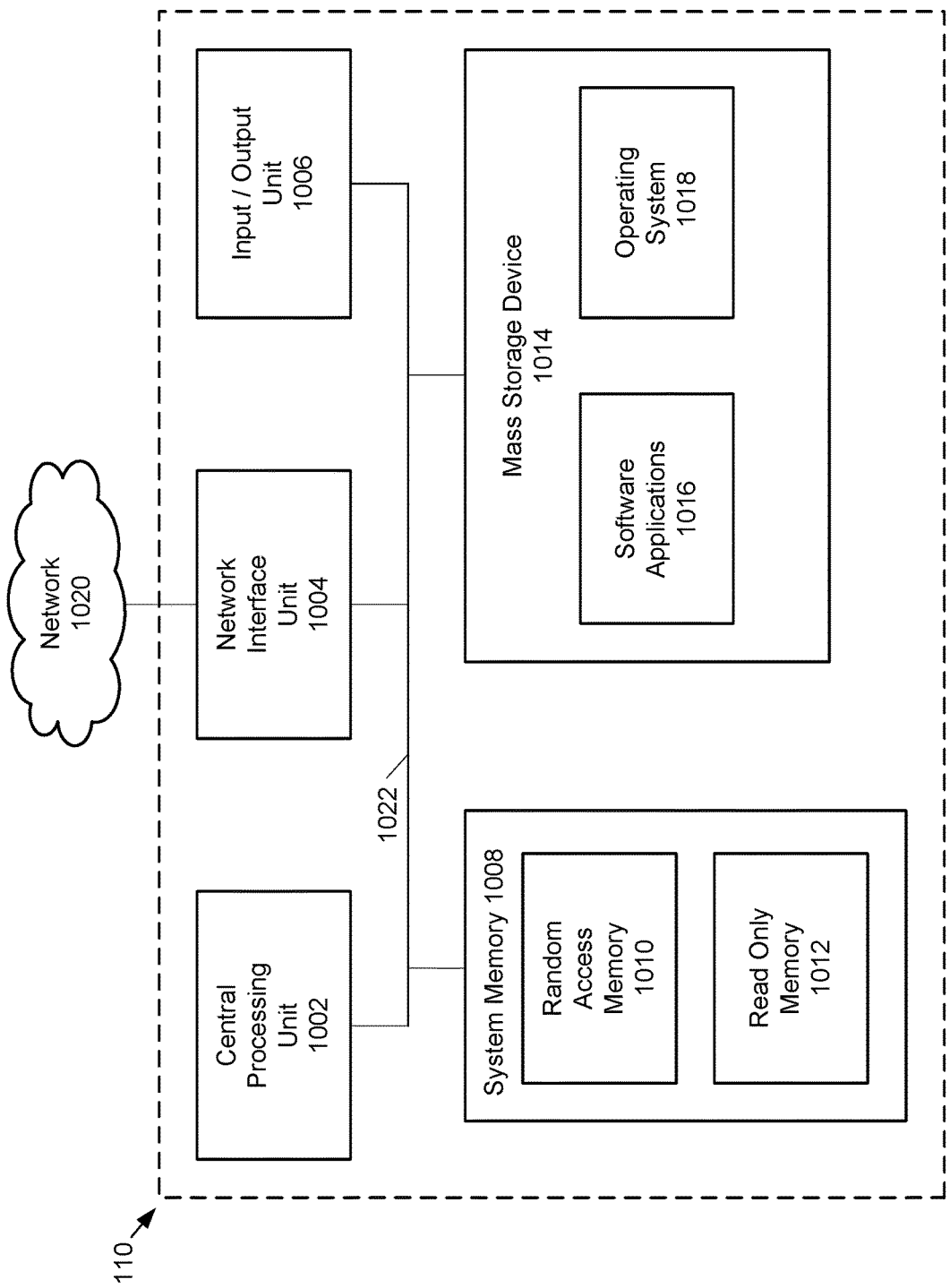
FIG. 10 shows example physical components of the financial institution server computer of FIG. 1.

As illustrated in the example of FIG. 10, financial institution server computer 110 includes at least one central processing unit ("CPU") 1002, a system memory 1008, and a system bus 1022 that couples the system memory 1008 to the CPU 1002. The system memory 1008 includes a random access memory ("RAM") 1010 and a read-only memory ("ROM") 1012. A basic input/output system that contains the basic routines that help to transfer information between elements within the financial institution server computer 110, such as during startup, is stored in the ROM 1012. The financial institution server computer 110 further includes a mass storage device 1014. The mass storage device 1014 is able to store software instructions and data.

The mass storage device 1014 is connected to the CPU 1002 through a mass storage controller (not shown) connected to the system bus 1022. The mass storage device 1014 and its associated computer-readable data storage media provide non-volatile, non-transitory storage for the financial institution server computer 110. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the financial institution server computer 110.

According to various embodiments of the invention, the financial institution server computer 110 may operate in a networked environment using logical connections to remote network devices through the network 1020, such as a wireless network, the Internet, or another type of network. The financial institution server computer 110 may connect to the network 1020 through a network interface unit 1004 connected to the system bus 1022. It should be appreciated that the network interface unit 1004 may also be utilized to connect to other types of networks and remote computing systems. The financial institution server computer 110 also includes an input/output controller 1006 for receiving and processing input from a number of other devices, including a touch user interface display screen, or another type of input device. Similarly, the input/output controller 1006 may provide output to a touch user interface display screen or other type of output device.

As mentioned briefly above, the mass storage device 1014 and the RAM 1010 of the financial institution server computer 110 can store software instructions and data. The software instructions include an operating system 1018 suitable for controlling the operation of the financial institution server computer 110. The mass storage device 1014 and/or the RAM 1010 also store software instructions, that when executed by the CPU 1002, cause the financial institution server computer 110 to provide the functionality of the financial institution server computer 110 discussed in this document. For example, the mass storage device 1014 and/or the RAM 1010 can store software instructions that, when executed by the CPU 1002, cause the financial institution server computer 110 to display received data on the display screen of the financial institution server computer 110.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method for authenticating a user of a mobile electronic computing device to perform one or more operations on a first electronic computing device, the method comprising:
   on the first electronic computing device, receiving a first request to access the first electronic computing device;
   in response to the first request to access, sending a first identifier to the mobile electronic computing device;
   receiving a second identifier from a second electronic computing device, the second electronic computing device being different from the mobile electronic computing device;
   when the first identifier matches the second identifier, calculating a first trust score for the user;
   when the first trust score is equal to or greater than a first threshold, authenticating the user to login to the first electronic computing device;
   receiving a second request to perform an operation on the first electronic computing device;
   when a determination is made that the first trust score is not high enough to permit the user to perform the operation:
      sending a third request to the mobile electronic computing device for the user to respond to one or more first questions;
      receiving from the mobile electronic computing device user answers to the one or more first questions; and
      based on the first trust score and the user answers to the one or more first questions, calculating a second trust score for the user; and
   when the second trust score is greater than or equal to a second threshold, the second threshold being higher than the first threshold, permitting the user to perform the operation.

2. The method of claim 1, wherein when the first trust score is less than the first threshold, further comprising:
   sending a second request to the mobile electronic computing device for the user to respond to one or more first questions;
   receiving from the mobile electronic computing device user answers to the one or more first questions;
   based on the first trust score and the user answers to the one or more first questions, calculating a second trust score for the user;
   when the second trust score is greater than or equal to the first threshold, authenticating the user to login to the first electronic computing device.

3. The method of claim 2, wherein the one or more first questions are personalized questions based on recent activity of the user.

4. The method of claim 3, where at least one of the one or more first questions is based on a recent purchase made by the user.

5. The method of claim 1, wherein after a first answer to the one or more first questions is sent to the user:
obtaining an evaluation of the first answer to the one or more first questions; and
determining an additional question to ask the user based on the evaluation of the first answer.

6. The method of claim 1, wherein when the second trust score is less than the second threshold, further comprising sending a fourth request to the mobile electronic computing device for the user to respond to one or more second questions, the one or more second questions having answers pre-recorded by the user.

7. The method of claim 6, further comprising:
receiving a voice response from the user for each the one or more second questions;
comparing the voice response with the answers pre-recorded by the user;
based on the second trust score and the voice response to the one or more second questions, calculating a third trust score for the user;
when the third trust score is greater than or equal to the second threshold, permitting the user to perform the operation.

8. The method of claim 7, wherein when the third trust score is less than the second threshold, further comprising sending a fifth request to the mobile electronic computing device for the user to provide biometric data.

9. The method of claim 8, further comprising:
receiving biometric data from the user;
analyzing the biometric data;
comparing the biometric data with biometric data previously obtained from the user;
based on the third trust score and the received biometric data, calculating a fourth trust score for the user; and
when the fourth trust score is greater than or equal to the first threshold, permitting the user to perform the operation.

10. The method of claim 9, wherein analyzing the biometric data comprises using one or more of facial recognition and an analysis of facial movement of the user, including lip movement.

11. The method of claim 1, wherein calculating the first trust score comprises:
determining a context for the user based on a current location for the user and a type of operation being requested by the user; and
using the context for the user and profile information for the user to calculate the first trust score.

12. The method of claim 1, wherein the first identifier is included in a token sent to the mobile electronic computing device, the first identifier uniquely identifying a communication session with the mobile electronic computing device, the token also including a uniform resource locator (URL) associated with the first electronic computing device.

13. A first electronic computing device comprising:
a processing unit; and
system memory, the system memory including instructions which, when executed by the processing unit, cause the first electronic computing device to:
receive a request to login to the first electronic computing device;
in response to the request to login, send a first token to a mobile electronic computing device;
receive a second token from a second electronic computing device associated with an embedded sensor;
when the first unique identifier in the first token matches a second unique identifier in the second token, calculating a first trust score for a user;
when the first trust score is equal to or greater than a threshold, authenticating the user to login to the first electronic computing device;
when the first trust score is less than the threshold, further comprising:
send a first request to the mobile electronic computing device for the user to respond to one or more first questions;
receive from the mobile electronic computing device user answers to the one or more first questions;
based on the first trust score and the user answers to the one or more first questions, calculate a second trust score for the user;
when the second trust score is greater or equal than the threshold, authenticating the user to login to the first electronic computing device; and
when the second trust score is less than the threshold:
send a second request to the mobile electronic computing device for the user to respond to one or more second questions, the one or more second questions having answers pre-recorded by the user;
receive a voice response from the user for each the one or more second questions;
compare the voice response with the answers pre-recorded by the user;
revise the second trust score based on the comparing to calculate a third trust score; and
when the third trust score is greater than or equal to the threshold, authenticate the user to login to the first electronic computing device.

14. The first electronic computing device of claim 13, wherein when the third trust score is less than the threshold, further causing the first electronic computing device to send a third request to the mobile electronic computing device for the user to provide biometric data.

15. The first electronic computing device of claim 14, further causing the first electronic computing device to:
receive the biometric data from the user;
analyze the biometric data;
compare the biometric data with biometric data previously obtained from the user;
revise the third trust score based on the comparing to form a fourth trust score; and
when the fourth trust score is greater than or equal to the threshold, authenticate the user to login to the first electronic computing device.

16. The first electronic computing device of claim 15, wherein analyze the biometric data comprises using one or more of facial recognition and an analysis of user facial movement, including lip movement.

17. A first electronic computing device comprising:
a processing unit; and
system memory, the system memory including instructions which, when executed by the processing unit, cause the first electronic computing device to:
receive a first request from a mobile electronic computing device to login to the first electronic computing device;

determine a first threshold for a first authentication trust score for logging onto the first electronic computing device;

calculate the first authentication trust score, the first authentication trust score being based on a current location of a user and a profile for the user;

when a determination is made that the first authentication trust score is greater than or equal to the first threshold, permit the user to login to the first electronic computing device;

receive a second request from the mobile electronic computing device to perform an operation on an application running on the first electronic computing device;

identify the operation to be performed;

determine a second threshold for an authentication trust score for performing the operation, the second threshold being based on a type of the operation to be performed, the second threshold being equal to or greater than the first threshold;

when a determination is made that the first authentication trust score is greater than or equal to the second threshold, permit the user to perform the operation;

when a determination is made that the first authentication trust score is less than the second threshold:

send a third request to the mobile electronic computing device for the user to respond to one or more first questions, the one or more first questions being personalized questions based on recent activity of the user;

receive from the mobile electronic computing device user answers to the one or more first questions;

based on the first authentication trust score and the user answers to the one or more first questions, calculate a second authentication trust score for the user;

when a determination is made that the second authentication trust score is greater than or equal to the second threshold, permit the user to perform the operation; and when the second authentication trust score is less than the second threshold:

send a fourth request to the mobile electronic computing device for the user to respond to one or more second questions, the one or more second questions having answers pre-recorded by the user;

receive from the mobile electronic computing device a voice response for each of the one or more second questions;

compare the voice response with the answers pre-recorded by the user;

based on the second authentication trust score and the voice response to the one or more second questions, calculate a third authentication trust score for the user; and when a determination is made that the third authentication trust score is greater than or equal to the second threshold, permit the user to perform the operation.

\* \* \* \* \*